United States Patent
Radtke et al.

(10) Patent No.: US 10,144,083 B2
(45) Date of Patent: Dec. 4, 2018

(54) MULTI-OPERATOR ENGINE DRIVEN WELDER SYSTEM

(71) Applicant: Illinois Tool Works Inc., Glenview, IL (US)

(72) Inventors: David Edwin Radtke, New London, WI (US); Alan Fredrick Smith, Fremont, WI (US); George Harold Baus, Kimberly, WI (US); Joseph Carl Gitter, New London, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 880 days.

(21) Appl. No.: 13/828,560

(22) Filed: Mar. 14, 2013

(65) Prior Publication Data

US 2014/0238966 A1 Aug. 28, 2014

Related U.S. Application Data

(60) Provisional application No. 61/768,246, filed on Feb. 22, 2013.

(51) Int. Cl.
*B23K 9/10* (2006.01)

(52) U.S. Cl.
CPC .......... *B23K 9/1043* (2013.01); *B23K 9/1068* (2013.01); *B23K 9/1075* (2013.01)

(58) Field of Classification Search
CPC ... B23K 9/1043; B23K 9/1068; B23K 9/1075
See application file for complete search history.

(56) References Cited

U.S. PATENT DOCUMENTS

| 2,172,882 A | 9/1939 | Watkins |
| 2,952,782 A | 9/1960 | Woyden |
| 3,514,621 A | 5/1970 | Farmer |

(Continued)

FOREIGN PATENT DOCUMENTS

| CN | 102686350 | 9/2012 |
| EP | 1138949 | 10/2001 |

(Continued)

OTHER PUBLICATIONS

International Search Report from PCT application No. PCT/US2014/015879, dated Jul. 7, 2014, 9 pgs.

(Continued)

*Primary Examiner* — Thien S Tran
(74) *Attorney, Agent, or Firm* — McAndrews, Held & Malloy, Ltd.

(57) ABSTRACT

An engine driven welder includes a generator configured to provide an electrical output, an engine coupled to the generator, an air compression system coupled to the engine, a first welding system coupled to the generator, and a second welding system. The engine is configured to drive the generator, and the air compression system is configured to provide a pneumatic output. The first welding system is configured to provide a first weld output, and the second welding system is configured to provide a second weld output. The second weld output is independent of the first weld output in an independent mode, and the second weld output is combined with the first weld output as a combined weld output in a parallel mode.

18 Claims, 4 Drawing Sheets

(56) References Cited

U.S. PATENT DOCUMENTS

| | | |
|---|---|---|
| 3,770,976 A | 11/1973 | Stroud |
| 4,117,304 A | 9/1978 | Wodzinski |
| 4,217,764 A | 8/1980 | Armbruster |
| 4,236,594 A | 12/1980 | Ramsperger |
| 4,508,954 A | 4/1985 | Kroll |
| 4,635,668 A | 1/1987 | Netter |
| 4,785,227 A | 11/1988 | Griffin |
| 4,788,487 A | 11/1988 | Picklesimer |
| 5,250,786 A | 10/1993 | Kikuchi |
| 5,410,126 A | 4/1995 | Miller |
| 5,421,705 A | 6/1995 | Benckert |
| 5,436,427 A | 7/1995 | Bourque |
| 5,563,451 A | 10/1996 | Furukawa |
| 5,574,622 A | 11/1996 | Brown |
| 5,670,070 A | 9/1997 | Clark |
| 5,671,112 A | 9/1997 | Hu |
| 5,734,147 A | 3/1998 | Bunker |
| 5,734,239 A | 3/1998 | Turner |
| 5,917,711 A | 6/1999 | Shikata |
| 5,968,385 A | 10/1999 | Beeson |
| 6,023,037 A | 2/2000 | Church |
| 6,121,691 A | 9/2000 | Renner |
| 6,153,855 A | 11/2000 | Renner |
| 6,166,525 A | 12/2000 | Crook |
| 6,177,645 B1 | 1/2001 | Church |
| 6,286,609 B1 | 9/2001 | Carrier |
| 6,291,798 B1 | 9/2001 | Stava |
| 6,394,758 B1 | 5/2002 | Lee |
| 6,401,012 B1 | 6/2002 | Aoki |
| 6,469,276 B1 | 10/2002 | Renner |
| 6,478,714 B2 | 11/2002 | Onnen |
| 6,531,685 B2 | 3/2003 | Smith |
| 6,532,926 B1 | 3/2003 | Kuroda |
| 6,603,213 B1 | 8/2003 | Renner |
| 6,720,678 B2 | 4/2004 | Green |
| 6,747,246 B2 | 6/2004 | Crandell |
| 6,754,579 B2 | 6/2004 | Kamiya |
| 6,777,649 B2 | 8/2004 | Reynolds |
| 6,812,584 B2 | 11/2004 | Renner |
| 6,812,585 B2 | 11/2004 | Renner |
| 7,017,327 B2 | 3/2006 | Hunt |
| 7,146,959 B2 | 12/2006 | Thompson |
| 7,166,818 B2 | 1/2007 | Stava |
| 7,231,994 B2 | 6/2007 | Buglione |
| 7,339,134 B2 | 3/2008 | Stropki |
| 7,353,084 B2 | 4/2008 | Schaper |
| 7,424,925 B2 | 9/2008 | Buglione |
| 7,482,704 B2 | 1/2009 | Priem |
| 7,502,668 B2 | 3/2009 | Schaper |
| 7,654,349 B2 | 2/2010 | Lee |
| 7,658,249 B2 | 2/2010 | Buglione |
| 7,673,713 B2 | 3/2010 | Betz |
| 7,692,409 B2 | 4/2010 | Schaper |
| 7,745,952 B2 | 6/2010 | Nakatsu |
| 7,777,447 B2 | 8/2010 | Vogel |
| 7,870,915 B2 * | 1/2011 | Beeson .............. B60P 3/14 180/53.1 |
| 7,908,911 B2 | 3/2011 | Renner |
| 8,008,800 B2 | 8/2011 | Mackin |
| 8,115,334 B2 | 2/2012 | Vyas |
| 8,134,244 B2 | 3/2012 | Wurth |
| 8,256,544 B2 | 9/2012 | Tarasinski |
| 8,342,150 B2 | 1/2013 | Renner |
| 8,464,526 B2 | 6/2013 | Renner |
| 8,502,115 B2 | 8/2013 | DuVal |
| 8,627,797 B2 | 1/2014 | Renner |
| 8,747,116 B2 * | 6/2014 | Zboray .............. G09B 19/24 219/130.21 |
| 8,859,937 B2 | 10/2014 | DuVal |
| 2001/0025838 A1 | 10/2001 | Kraus |
| 2002/0033157 A1 | 3/2002 | Thompson |
| 2002/0038643 A1 | 4/2002 | Sumimoto |
| 2002/0179349 A1 | 12/2002 | Field |
| 2002/0190044 A1 | 12/2002 | Leisner |
| 2003/0035719 A1 | 2/2003 | Wadia |
| 2003/0066819 A1 | 4/2003 | ShahaniShargh |
| 2003/0164645 A1 | 9/2003 | Crandell, III |
| 2003/0189338 A1 | 10/2003 | Rose |
| 2003/0222626 A1 | 12/2003 | Renner |
| 2004/0089258 A1 | 5/2004 | Buglione |
| 2004/0108728 A1 | 6/2004 | Renner |
| 2005/0109550 A1 | 5/2005 | Buglione |
| 2005/0111997 A1 | 5/2005 | Smith |
| 2006/0037953 A1 | 2/2006 | Matthews |
| 2006/0067833 A1 | 3/2006 | McAuliffe |
| 2006/0090437 A1 | 5/2006 | Hunt |
| 2006/0175313 A1 | 8/2006 | Kooken |
| 2006/0231532 A1 | 10/2006 | Bunker |
| 2006/0273075 A1 | 12/2006 | Samodell |
| 2007/0181547 A1 | 8/2007 | Vogel |
| 2007/0219669 A1 | 9/2007 | Schaper |
| 2008/0083705 A1 | 4/2008 | Peters |
| 2008/0093347 A1 | 4/2008 | Yamaguchi |
| 2008/0116186 A1 | 5/2008 | Luck |
| 2008/0122195 A1 | 5/2008 | Beeson |
| 2008/0172170 A1 | 7/2008 | Lecole |
| 2008/0264922 A1 | 10/2008 | Fosbinder |
| 2008/0271935 A1 | 11/2008 | Mese |
| 2008/0308541 A1 | 12/2008 | Hiroi |
| 2009/0139781 A1 | 6/2009 | Straubel |
| 2009/0194067 A1 | 8/2009 | Peotter |
| 2009/0294191 A1 | 12/2009 | Sheidler |
| 2010/0133900 A1 | 6/2010 | King |
| 2010/0199655 A1 | 8/2010 | Renner |
| 2010/0271197 A1 | 10/2010 | Almeida |
| 2010/0286856 A1 | 11/2010 | LeBrusq |
| 2010/0301672 A1 | 12/2010 | DiCristofaro |
| 2011/0011113 A1 | 1/2011 | Jordan |
| 2011/0155710 A1 | 6/2011 | Farah |
| 2011/0241913 A1 | 10/2011 | Ikeda |
| 2011/0309062 A1 * | 12/2011 | O'Donnell .......... B23K 9/1043 219/130.1 |
| 2012/0049792 A1 | 3/2012 | Crombez |
| 2012/0083173 A1 | 4/2012 | McMillan |
| 2012/0242156 A1 | 9/2012 | Butzmann |
| 2013/0043723 A1 | 2/2013 | Daniels |
| 2013/0318971 A1 | 12/2013 | Sora |

FOREIGN PATENT DOCUMENTS

| | | |
|---|---|---|
| EP | 2002917 | 12/2008 |
| JP | 62158938 | 7/1987 |
| JP | 3168376 | 7/1991 |
| JP | 10288427 | 10/1998 |
| JP | 20050224838 | 9/2003 |
| JP | 2009000724 | 7/2010 |
| WO | 20080156946 | 2/2006 |
| WO | 2008045584 | 4/2008 |
| WO | 2008060753 | 5/2008 |
| WO | 2008067252 | 6/2008 |
| WO | 2008134182 | 11/2008 |
| WO | 2009051979 | 4/2009 |

OTHER PUBLICATIONS

"Miller 302 Trailblazer," YouTube, Uploaded by 7863348 on May 11, 2008, retrieved from the Internet <http://www.youtube.com/watch?v=9WYtEvIM-RY>.

Lincoln Electric, "Multi-Weld 350 Arc Converter Service Manual," Jul. 2000. http://www.red-d-arc.com/pdf/MX350%20Service%20Manual.pdf.

Miller Trailblazer Series, Spec Sheet, Apr. 2010, Index No. ED/4.77, pp. 1-8.

* cited by examiner

MULTI-OPERATOR ENGINE DRIVEN WELDER SYSTEM

CROSS-REFERENCE TO RELATED APPLICATION

This application claims priority from and the benefit of U.S. Provisional Application Ser. No. 61/768,246, entitled "MULTI-OPERATOR ENGINE DRIVEN WELDER SYSTEM," filed Feb. 22, 2013, which is hereby incorporated by reference in its entirety for all purposes.

BACKGROUND

The invention relates generally to an engine driven welder and, more particularly, to a multi-operator engine driven welder system.

A prime mover (e.g., an engine) drives a generator to provide power to loads or tools when a work area is remote from a traditional power source (e.g., mains power) or other power sources are unavailable. The engine driven generator may supply power to a welding system to support a variety of processes, such as metal inert gas (MIG) welding, tungsten inert gas (TIG) welding, shielded metal arc (SMAW) welding, plasma cutting, arc gouging, and so forth. Multiple operators at a work area may use separate engine driven generators and welding systems. Separate engines may drive compressors or hydraulic pumps to provide a compressed fluid for other processes at the work area. Multiple separate engine driven generators and engine driven compressors at the work area occupy space, which may be limited. Unfortunately, each engine may increase noise or exhaust gases in the work area.

BRIEF DESCRIPTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In one embodiment, an engine driven welder includes a generator configured to provide an electrical output, an engine coupled to the generator, an air compression system coupled to the engine, a first welding system coupled to the generator, and a second welding system. The engine is configured to drive the generator, and the air compression system is configured to provide a pneumatic output. The first welding system is configured to provide a first weld output, and the second welding system is configured to provide a second weld output. The second weld output is independent of the first weld output in an independent mode, and the second weld output is combined with the first weld output as a combined weld output in a parallel mode.

In another embodiment, a system includes an engine, an air compression system coupled to the engine, and a multi-operator welding system coupled to the engine. The air compression system is configured to produce a pneumatic output. The multi-operator welding system is configurable in an independent mode and a combined mode. The multi-operator welding system includes a first terminal set configured to receive a first weld output from the multi-operator welding system in the independent mode, and to receive the first weld output and a second weld output from the multi-operator welding system in the combined mode. The multi-operator welding system includes a second terminal set configured to receive the second weld output from the multi-operator welding system in the independent mode.

In another embodiment, a system includes an engine, a generator coupled to the engine, an air compressor coupled to the engine, a controller coupled to the engine, and an enclosure configured to at least partially surround the engine, the generator, a first welding system, a second welding system, the air compressor, and the controller. The generator is configured to supply electrical power to the first welding system via a first winding and to the second welding system via a second winding. A first weld output of the first welding system is combined with a second weld output of the second welding system in a combined mode. The air compressor is configured to produce a pneumatic output. The controller is configured to control a speed of the engine based at least in part on the pneumatic output, the first weld output, or the second weld output, or any combination thereof.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
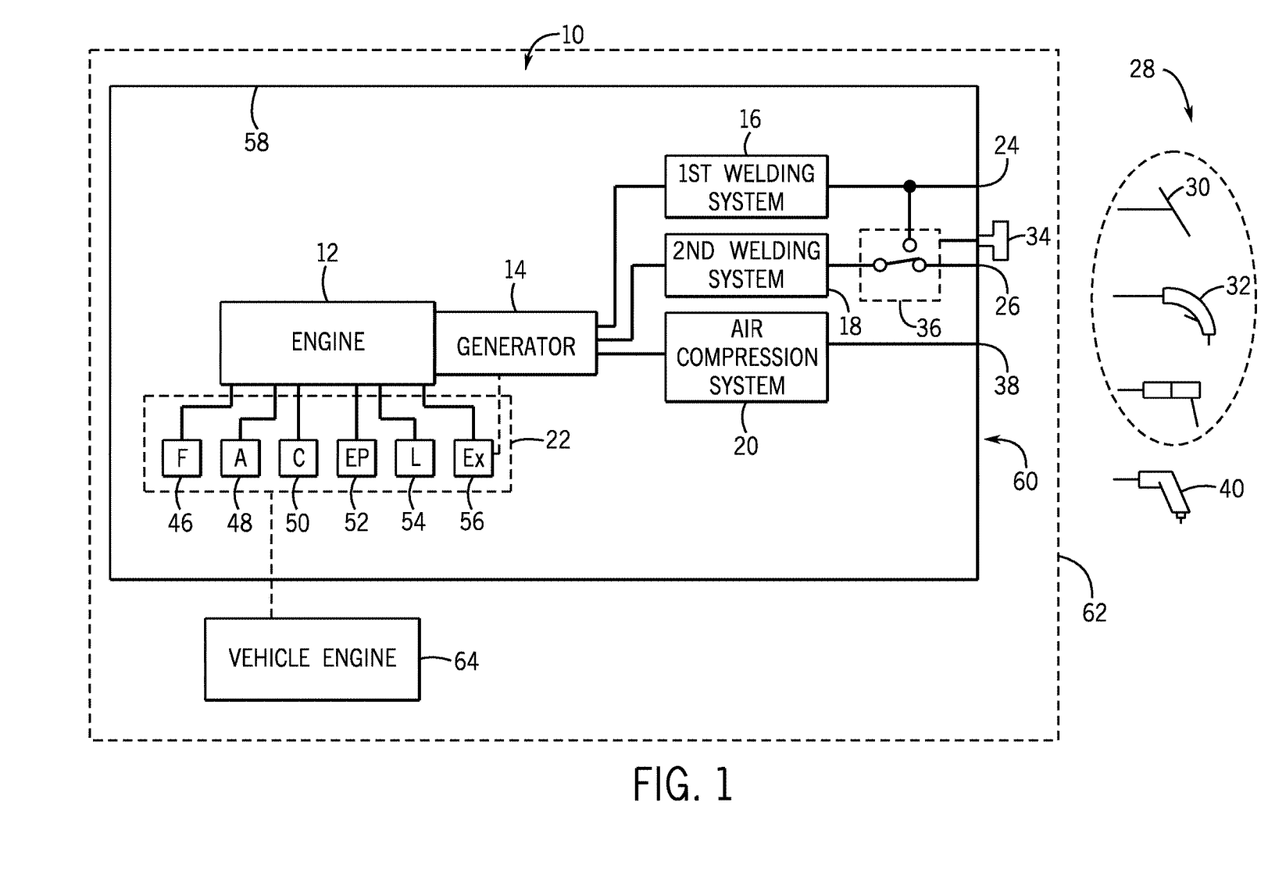
FIG. 1 is a diagram of an embodiment of a multi-operator engine driven welder with an air compression system.

Turning to FIG. 1, a multi-operator engine driven welder 10 provides electrical output and compressed air for multiple applications. An engine 12 drives a generator 14 to produce electrical output. The electrical output may power one or more loads, such as a first welding system 16, a second welding system 18, an air compression system 20, an engine support system 22, an auxiliary component (e.g., hydraulic pump) of the multi-operator engine driven welder 10, an accessory connected to the multi-operator engine driven welder 10, or any combination thereof. The electrical output may be an alternating current (AC) or a direct current (DC). In some embodiments, the engine 12 drives the air compression system 20 directly.

The first welding system 16 and a second welding system 18 process portions of the electrical output into weld outputs suitable for one or more welding applications. As discussed herein, welding applications include, but are not limited to, shielded metal arc welding (SMAW) (e.g., stick welding), metal inert gas (MIG) welding, tungsten inert gas (TIG) welding, plasma cutting, and arc gouging. The first welding system 16 processes a first portion of the electrical output from the generator 14 to provide a first weld output to a first terminal set 24 of the multi-operator engine driven welder 10. A second welding system 20 processes a second portion of the electrical output from the generator 14 to provide a second weld output to a second terminal set 26 of the multi-operator engine driven welder 10. One or both of the first welding system 16 and the second welding system 18 may be a multi-process welding system, thereby enabling an operator to perform multiple types of welding applications from the same terminal set (e.g., first terminal set 24, second terminal set 26). In some embodiments, the first and/or second welding systems 16, 18 may convert a DC electrical input to a weld output with a controlled waveform, such as a pulsed welding process or a short circuit welding process (e.g., regulated metal deposition (RMD™)). In some embodiments, the first weld output and the second weld output may be a constant current (CC) or constant voltage (CV) weld output. In some embodiments, the first weld output or the second weld output may be an AC weld output.

Multiple torches 28 may be connected to the multi-operator engine driven welder 10, thereby enabling multiple operators to perform welding applications from the same engine driven welder. The first welding system 16 and the second welding system 18 are separately connected to the generator 14. The first and second welding systems 16, 18 may be electrically insulated from one another to be independent. In some embodiments, the first welding system 16 may supply the first weld output to the first terminal set 24 independent of the second weld output second welding system 18 second output to the second terminal set 26. Accordingly, a first operator may perform a first welding (e.g., TIG welding) application with a first torch 30 connected to the first terminal set 24, while a second operator performs a second welding (e.g., pulsed MIG) welding application with a second torch 32 connected to the second terminal set 26. That is, the first welding system 16 and the second welding system 18 may provide independent weld outputs simultaneously, thereby enabling multiple operators to perform welding applications simultaneously. The first and second welding system 16, 18 may also provide weld outputs at different times from one another.

The first and second welding system 16, 18 of the multi-operator engine driven welder 10 may be configurable in an independent mode or a combined (e.g., parallel) mode. A mode input 34 (e.g., lever, dial, button) controls the mode of the multi-operator engine driven welder 10 through a switch 36. In the independent mode, the first weld output is controlled and supplied to the first terminal set 24 independent of the second weld output supplied to the second terminal set 26. That is, the first operator utilizing the first welding system 16 may use a different process (e.g., stick, TIG, MIG, arc gouging) with different electrical output parameters (e.g., voltage, amperage, CC, CV, controlled waveform) than the second operator utilizing the second welding system 18. In the combined mode, the second weld output from the second welding system 18 is combined (e.g., summed) with the first weld output from the first welding system 16 as a combined weld output. The combined output may be provided to the first terminal set 24 or the second terminal set 26 based on the arrangement of the switch 36. The combined output may be utilized for the same processes (e.g., stick, TIG, MIG, arc gouging) and as the first or second weld outputs with the greater power. The power available for welding applications in the combined mode may be approximately the sum of the power available to the separate welding systems 16, 18.

In some embodiments, the first welding system 16 and the second welding system 18 have the same independent mode output range (e.g., maximum voltage, maximum amperage). For example, the first welding system 16 and the second welding system 18 may provide weld outputs of up to approximately 400 A; a combined weld output formed from the first weld output and the second weld output may have a combined weld output range of up to approximately 800 A. In some embodiments, the first welding system 16 and the second welding system 18 have different independent mode output ranges that may be combined to provide the combined mode output range. The combined mode output range may thereby be greater than the separate independent mode output ranges of the first and second welding systems 16, 18 of the multi-operator engine driven welder 10.

The air compression system 20 is driven by the engine 12 to provide a pneumatic output (e.g., compressed air, compressed inert gas) to a pneumatic terminal 38. The pneumatic output may be utilized to power a pneumatic tool 40 (e.g., drill, power tool), pneumatic accessory (e.g., fan, pneumatic motor), or torch 28 for use in a welding application (e.g., carbon arc gouging, plasma cutting). In some embodiments, the air compression system 20 is driven by a portion of the electrical output of the generator 14, such as via an electric motor. In other embodiments, the air compression system 20 may be driven by the engine 12 via a belt drive or direct connection to the engine 12.

In some embodiments, the engine 12 drives the generator 14 by combusting a fuel (e.g., diesel, gasoline, biofuel) from one or more fuel tanks 46. For example, the engine 12 may be a 2.9 L Turbocharged Diesel engine available from Deutz Corporation of Cologne, Germany. Engine support systems 22 may include, but are not limited to, the fuel tanks 46, an air intake or air cleaning system 48, a cooling system 50, an electrical protection and distribution system 52, a lube oil system 54, and an exhaust system 56. The multi-operator engine driven welder 10 may have an enclosure 58 that at least partially surrounds some of the components (e.g., engine 12, generator 14, first welding system 16, second welding system 18, air compression system 20). For example, the engine 12, the first welding system 16, the second welding system 18, and a compressor of the air compression system 20 may be installed within the same enclosure 58. The first terminal set 24, second terminal set 26, and the pneumatic terminal 38 may be within the enclosure 58, or arranged on an exterior surface 60 of the enclosure 58. In some embodiments, one or more of the engine support systems 22 (e.g., exhaust system 56) may be arranged partially outside the enclosure 58. In some embodiments, the multi-operator engine driven welder 10 may be installed on a mobile platform 62, such as a work vehicle or trailer. The multi-operator engine driven welder 10 installed on a work vehicle may share one or more of the support systems 22 (e.g., fuel tank 46, cooling system 50, exhaust system 56) with a vehicle engine 64 of the mobile platform 62.

Figure 2:
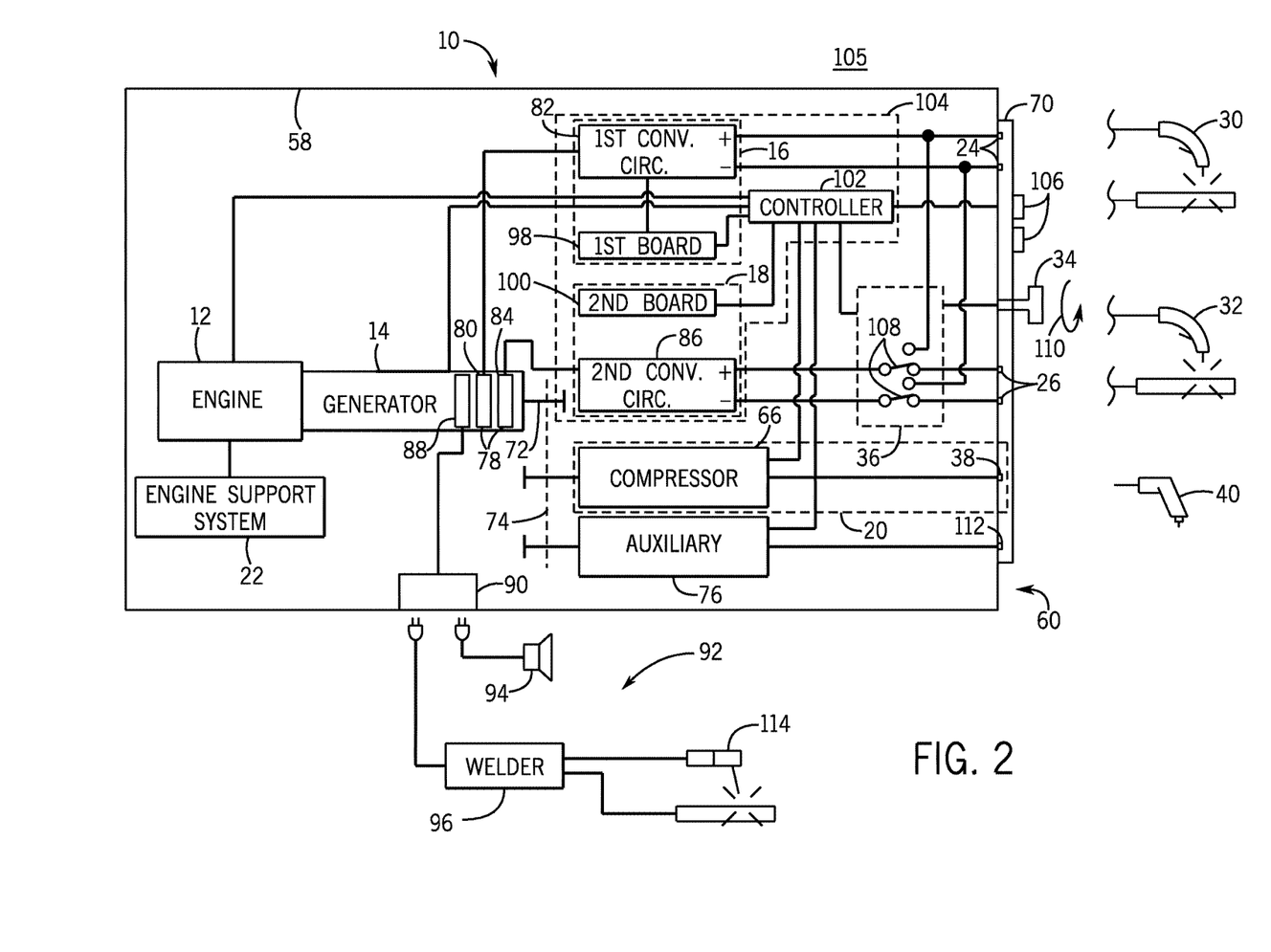
FIG. 2 is a schematic of an embodiment of the multi-operator engine driven welder with an operator interface.

FIG. 2 illustrates a schematic of an embodiment of the multi-operator engine driven welder 10 with an operator interface 70. The engine 12 drives the generator 14 via a drive shaft 72. In some embodiments, the drive shaft 72 directly drives a compressor 66 of the air compression system 20. A belt 74 about the drive shaft 72 may drive the compressor 66. In some embodiments, the belt 74 drives other components, such as an auxiliary system 76 or one or more of the engine support systems 22. The generator 14 transfers electrical output via windings 78. A first winding 80 provides a first portion of the electrical output to a first conversion circuit 82 of the first welding system 16. A second winding 84 provides a second portion of the electrical output to a second conversion circuit 86 of the second welding system 18. In some embodiments, a third winding 88 provides a third portion of the electrical output to an accessory terminal 90. The accessory terminal 90 provides the third portion of the electrical output in a suitable form (e.g., approximately 120 VAC at 60 Hz, approximately 230 VAC at 50 Hz) to power accessories 92, such as lights 94, a fan, or a static welder 96.

A first control board 98 controls the first conversion circuit 82 to convert the first portion of the electrical output to the first weld output. A second control board 100 controls the second conversion circuit 86 to convert the second portion of the electrical output to the second weld output. The first and second conversion circuits 82, 86 may convert the respective weld outputs from the electrical outputs via insulated-gate bipolar transistors (IGBTs), power supplies, switches, boost converters, buck converters, rectifiers, or any combination thereof. In some embodiments, the first conversion circuit 82 utilizes one or more IGBTs, and the second conversion circuit 86 utilizes one or more IGBTs. In some embodiments, the first and second welding circuits 16, 18 may have heat sinks to dissipate heat from the respective conversion circuits 82, 86.

In some embodiments, a controller 102 is connected to various components of the multi-operator engine driven welder 10. The controller 102 provides instructions to the first control board 98 and to the second control board 100 based at least in part on the process type and electrical output parameters for the one or more desired weld outputs (e.g., first weld output, second weld output, combined weld output). In the independent mode, the controller 102 instructs the first control board 98 to control the first conversion circuit 82 to produce the first weld output independent of the second control board 100 controlling the second conversion circuit 86 to produce the second weld output. In some embodiments with or without a controller 102, the first control board 98 is configured as a master control board to provide instructions to the second control board 100 that is configured as a slave control board. Accordingly, the first control board 98 (e.g., master) may control the first conversion circuit 82 directly and control the second conversion circuit 86 indirectly via the second control board 100 (e.g., slave). In some embodiments without a master-slave relationship between the control boards, the controller 102 in the combined mode instructs the first control board 98 to control the first conversion circuit 82, and the controller 102 instructs the second control board 100 to control the second conversion circuit 86. In some embodiments, the first and second control boards 98, 100 may receive weld output and process settings directly from the operator interface 70, and control the first and second conversion circuits 82, 86 without instructions from the controller 102.

In some embodiments, the controller 102 or the first control board 98 (e.g., master) may be connected to the engine 12, the generator 14, the air compression system 20, the auxiliary system 76, the switch 36, or the operator interface 70, or any combination thereof. The controller 102 or the first control board 98 may control electrical output parameters (e.g., voltage, amperage, power, process type, controlled waveform) of the weld outputs as described above. The controller 102 or the first control board 98 may control parameters (e.g., pressure, quantity, distribution) of the pneumatic output from the compressor 66. In some embodiments, the auxiliary system 76 is a hydraulic system, and the controller 102 or the first control board 98 may control the pressure and/or quantity of the hydraulic output from the hydraulic system.

The controller 102 or the first control board 98 may monitor the load on the generator 14 and/or the engine 12. In some embodiments, the speed of the engine 12 may be adjusted based on the load. For example, the controller 102 or the first control board 98 may increase the engine speed during high loads, and decrease the engine speed during idle loads. The controller 102 or the first control board 98 may reduce the load on the engine 12 by reducing the electrical output provided to the first and second welding systems 16, 18 and/or disengaging the compressor 66 or auxiliary system 76 from the drive shaft 72. In some embodiments, the compressor 66 or the auxiliary system 76 may be disengaged from the drive shaft 72 via a clutch.

In some embodiments, electrical components of the multi-operator engine driven welder 10 may be isolated in a vault 104 from an exterior environment 105. For example, the first welding system 16 and the second welding system 18 may be arranged in one or more vaults 104 within the enclosure 58. The one or more vaults 104 may enclose the first conversion circuitry 82, the second conversion circuitry 86, the first control board 98, the second control board 100, or the controller 102, or any combination thereof.

The controller 102 provides instructions to the first control board 98 and the second control board 100 based at least in part on settings provided through operator inputs 106 of the operator interface 70. The operator inputs 106 may include, but are not limited to buttons, dials, knobs, switches, touch screens, and other input devices. Through the operator inputs 106, the operator may adjust the welding process type (e.g., stick, MIG, TIG), the electrical output parameters (e.g., amperage, voltage), and parameters of the pneumatic output and auxiliary outputs. The operator may adjust the mode input 34 between the independent mode and the combined mode to control a quantity of powered terminals (e.g., the first terminal set 24 and/or the second terminal set 26). Adjusting the mode input 34 toggles contacts 108 of the switch 36 of the multi-operator engine driven welder 10. In some embodiments, the switch 36 is within the enclosure 58, such as within the vault 104. The mode input 34 may be a lever that rotates as shown by arrow 110 to change the mode between the independent mode and the combined mode. In the independent mode, the contacts 108 direct the second weld output from the second conversion circuit 86 to the second terminal set 26 and the second torch 32 connected to the second terminal set 26. In the combined mode, the contacts 108 connect the second conversion circuit 86 to the first terminal set 24 to direct the second weld output and the first weld output to the first torch 30 connected to the first terminal set 24.

The multi-operator engine driven welder 10 may support multiple operators in a work area performing varied tasks whether performed simultaneously or at different times from one another. For example, the multi-operator engine driven welder 10 of FIG. 2 may provide a first weld output to a first operator utilizing the first torch 30, a second weld output to a second operator utilizing the second torch 32, and pneumatic output to a third operator utilizing the pneumatic tool 40. The multi-operator engine driven welder may power the first torch 30, the second torch 32, and the pneumatic tool 40 simultaneously. In some embodiments, the first and/or the second operator may utilize the pneumatic output with the respective torches 30, 32, such as for a carbon arc gouging process. Moreover, in some embodiments, the multi-operator engine driven welder 10 may support three or more welding applications simultaneously. For example, first and second operators may perform welding applications utilizing the first and second torches 30, 32 as discussed above, and a third operator may utilize a third torch 114 powered by a static welder 96 connected to the accessory terminal 90.

Figure 3:
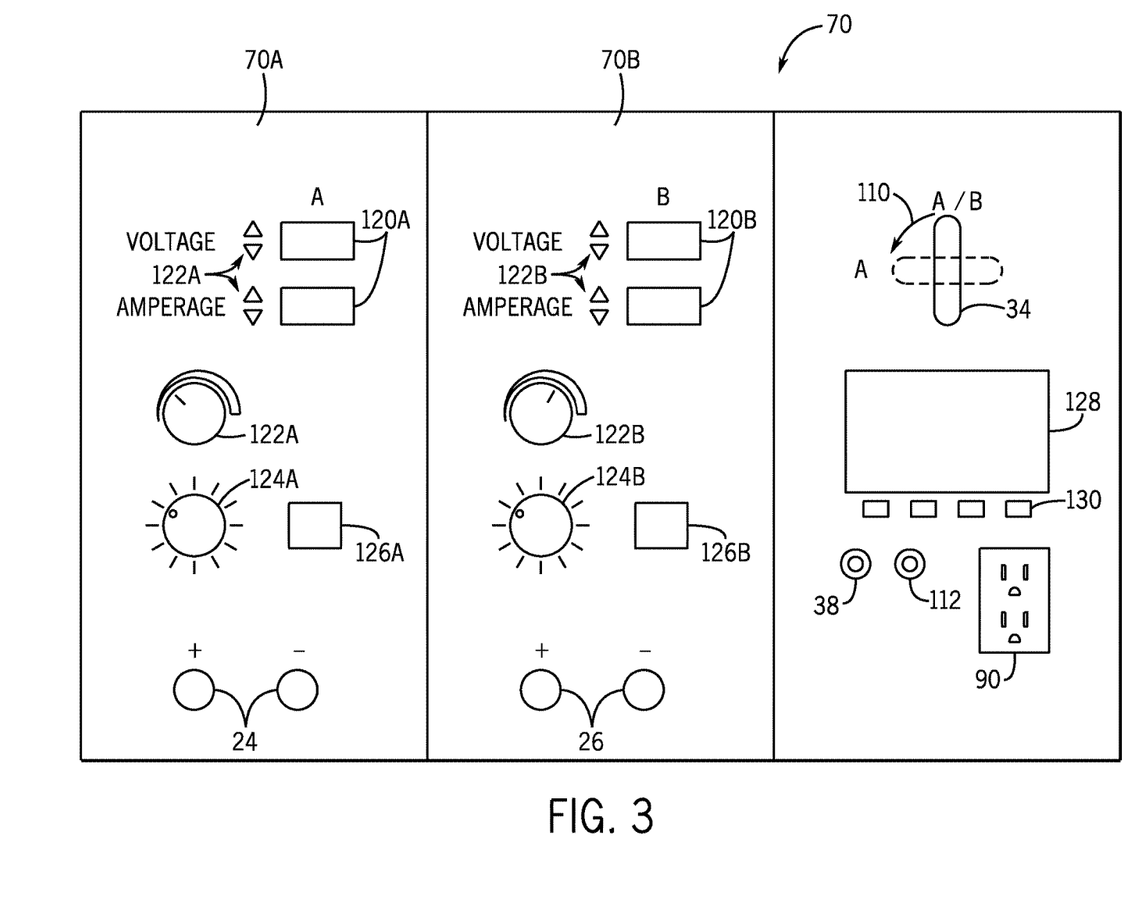
FIG. 3 illustrates an embodiment of the operator interface of the multi-operator engine driven welder of FIG. 2.

FIG. 3 illustrates an embodiment of the operator interface 70 of the multi-operator engine driven welder 10. The illustrated operator interface 70 has a first interface portion 70A to receive input for the first welding system 16 and a second interface portion 70B to receive input for the second welding system 18. System displays 120A and 120B display the electrical output parameters (e.g., voltage, amperage) for each respective welding system, and setting inputs 122A and 122B enable the operator to adjust the settings for each respective welding system. Process controls 124A and 124B provide the operator with controls to select a desired process for the torch 28 connected to the respective terminal set 24, 26. For example, the first terminal set 24 may direct the first weld output to a MIG torch, and the second terminal set 26 may direct the second weld output to a carbon arc gouging torch. The first operator may adjust the setting input 122A and process control 124A to desired settings for a MIG welding application independent from the setting input 122B and process control 124B that are adjusted to desired settings for carbon arc gouging by the second operator. In some embodiments, communications ports 126A and 126B enable welding accessories (e.g., wire feeder, pendant, torch) to communicate with the respective welding systems 16, 18 via a wired or wireless connection.

The mode input 34 controls the first welding system 16 and the second welding system 18 to operate in the independent mode (e.g., A/B) or the combined mode (e.g., A). In the independent mode, the first interface portion 70A controls and displays information related to the first welding system 16, and the second interface portion 70B controls and displays information related to the second welding system 18. Adjusting the mode input 34 from the independent mode to the combined mode, as shown by arrow 110, combines the first weld output and the second weld output as a combined weld output. The common weld output is directed to the first terminal set 24 or to the second terminal set 26 based at least in part on the arrangement of the switch 36. Directing the combined weld output to the first terminal set 24 enables the operator to adjust the electrical output parameters and process parameters of the combined weld output via a shared interface portion (e.g., the first interface portion 70A). In the combined mode, the controller 102 controls the first conversion circuit 82 and the second conversion circuit 86 to collectively produce the combined weld output based at least in part on input received via the shared interface portion.

In some embodiments, the operator may adjust the electrical output parameters and process parameters of the combined weld output via input to either the first interface portion 70A or the second interface portion 70B. While in the combined mode, the operator may adjust the electrical output parameters of the combined weld output through the operator interface 70 beyond the independent mode output range (e.g., maximum voltage, maximum amperage) of the first welding system 16 or the second welding system 18. In some embodiments, the combined output range may be approximately the sum of the independent mode output ranges of the first weld system 16 and the second weld system 18. For example, the combined mode output range is up to approximately 1000 A for a first welding system 16 with an independent mode output range of up to approximately 600 A, and a second welding system 18 with an independent mode output range of up to approximately 400 A.

In some embodiments, the displays 120A, 120B provide status indicators to the one or more operators to notify about operating conditions of the multi-operator engine driven welder 10. Status indicators and information may be displayed via a separate display 128 and/or gauges. For example, the separate display 128 or gauges may display a fuel level, a load on the engine 12, a load on the generator 14, an operating temperature, pressure of air compression system, quantity of compressed air, and so forth. In some embodiments, the display 128 is an electronic display with a navigable menu. Buttons 130 may be connected to the display 128 to provide input to the controller 102 for adjusting operation of the multi-operator engine driven welder 10.

One or more pneumatic terminals 38 supply the pneumatic output to connected tools and components. In some embodiments, one or more accessory terminals 90 may be on the operator interface 70 to supply accessory electrical power to connected accessories. Auxiliary output terminals 112 may be accessible through the operator interface 70 to supply the auxiliary output to connected components. In some embodiments, the auxiliary output terminals 112 may supply a hydraulic output to a hydraulic motor or hydraulic system (e.g., piston, lift arm).

Figure 4:
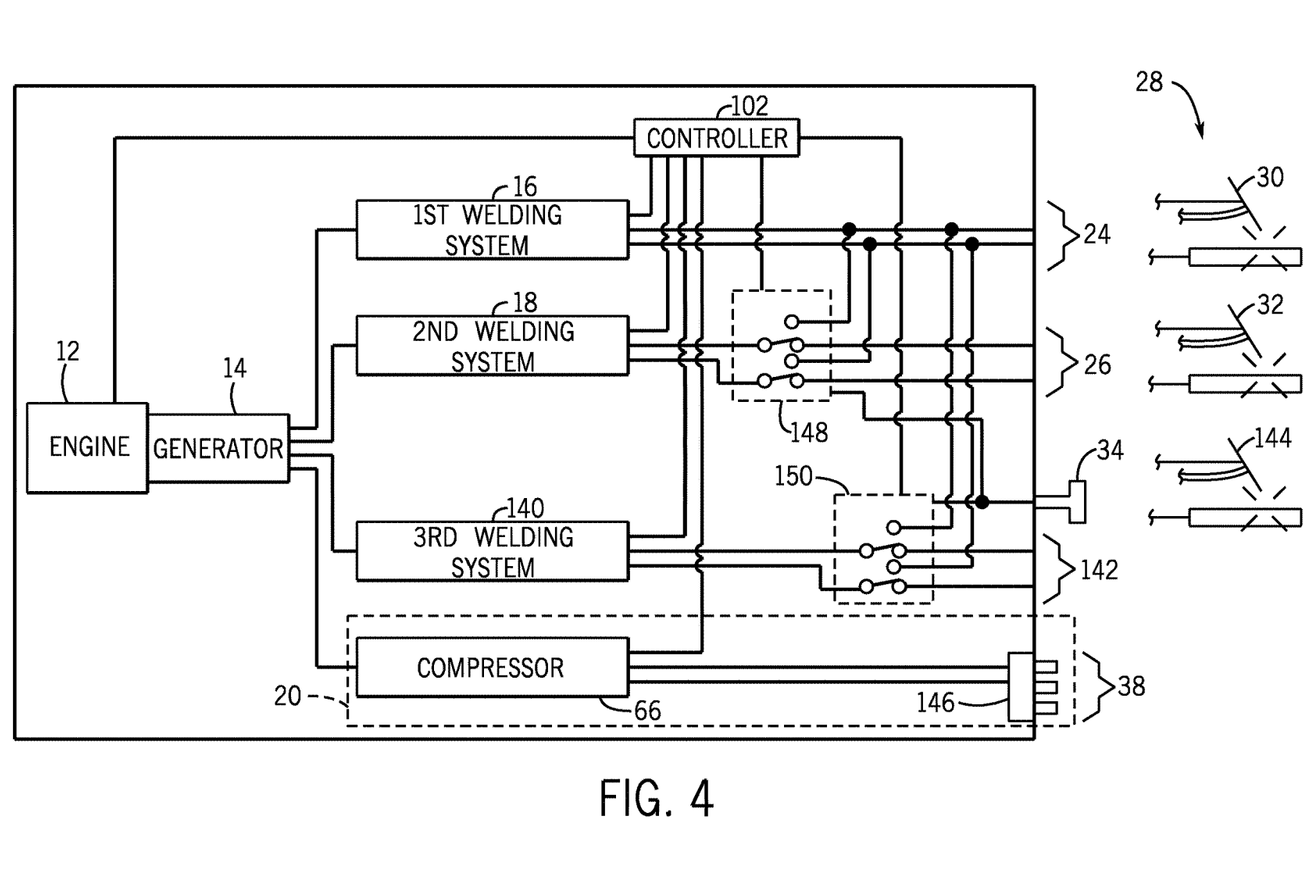
FIG. 4 is a diagram of an embodiment of the multi-operator engine driven welder with three welding systems and a compressor.

FIG. 4 illustrates an embodiment of a multi-operator engine driven welder 10 having three welding systems and an air compression system 20. The first and second welding systems 16, 18 may be similar to those described above in FIGS. 1 and 2. The first welding system 16 provides a first weld output to the first torch 30 connected to a first terminal set 24, and the second welding system 18 provides a second weld output to the second torch 32 connected to a second terminal set 26. A third welding system 140 provides a third weld output to a third terminal set 142, and to a third torch 144 connected to the third terminal set 142. The third weld output may be supplied to the third torch 144 independent of the first weld output and/or independent of the second weld output. Accordingly, in some embodiments the multi-operator engine driven welder 10 may provide three independent weld outputs simultaneously for three welding applications.

The compressor 66 of the multi-operator engine driven welder 10 may supply the pneumatic output simultaneously with one or more of the weld outputs. In some embodiments, the compressor 66 supplies the pneumatic output to a manifold 146 or valve system that divides the pneumatic output into pneumatic output portions. The pneumatic output portions may be supplied to different pneumatic tools and/or to different torches. For example, two or more of the operators may perform carbon arc gouging applications utilizing weld outputs and pneumatic output portions from the multi-operator engine driven welder 10.

The multi-operator engine driven welder 10 of FIG. 4 may operate in an independent mode or a combined mode. In the independent mode, each welding system (e.g., first welding system 16, second welding system 18, third welding system 140) is controlled to provide independent weld outputs. The multi-operator engine driven welder 10 with a third welding system 140 may be configurable in multiple combined modes by adjusting the mode input 34. For example, a first switch 148 may be adjusted to enable the first weld output and the second weld output to be supplied to the first terminal set 24 as a first combined weld output. Two operators may perform welding applications utilizing the first combined weld output and the third weld output from the third welding system 140. A second switch 150 may be adjusted to enable the first weld output and the third weld output to be supplied to the first terminal set 24 as a second combined weld output. Two operators may perform welding applications utilizing the second combined weld output and the second weld output from the second welding system 18. In some embodiments, the first switch 148 and the second switch 150 may be closed to enable the first weld output, the second weld output, and the third weld output to be supplied to the first terminal set 24 as a combined weld output of all three weld outputs.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An engine driven welder comprising:
a generator configured to provide an electrical output;
an engine coupled to the generator and configured to drive the generator;
an air compression system coupled to the engine, wherein the air compression system is configured to provide a pneumatic output;
a first welding system coupled to the generator and configured to provide a first weld output;
a second welding system coupled to the generator and configured to provide a second weld output, wherein the second weld output is independent of the first weld output in an independent mode, and the second weld output is combined with the first weld output as a combined weld output in a parallel mode; and
an operator interface having a first interface portion configured to receive a first set of inputs relating to operating parameters of the first weld output of the first welding system, a second interface portion configured to receive a second set of inputs relating to operating parameters of the second weld output of the second welding system, and a mode input configured to switch the engine driven welder between the independent mode and the parallel mode.

2. The engine driven welder of claim 1, wherein the generator comprises a first winding coupled to the first welding system, and a second winding coupled to the second welding system, wherein the first winding is independent of the second winding.

3. The engine driven welder of claim 1, wherein the first welding system comprises a first control board configured to control the first weld output, the second welding system comprises a second control board configured to control the second weld output, and the first control board is configured to control the second control board in the parallel mode.

4. The engine driven welder of claim 1, wherein the first weld output and the second weld output each comprise a constant current output or a constant voltage output.

5. The engine driven welder of claim 1, comprising an operator input configured to select the independent mode or the parallel mode, wherein the operator input is configured to engage a switch between the first welding system and the second welding system in the parallel mode, and to disengage the switch in the independent mode.

6. The engine driven welder of claim 1, comprising an auxiliary circuit coupled to the generator, wherein the auxiliary circuit is configured to provide an auxiliary output to an auxiliary output terminal.

7. The engine driven welder of claim 1, comprising an accessory output terminal configured to provide electrical power to one or more accessories.

8. The engine driven welder of claim 1, comprising a controller coupled to the engine, wherein the controller is configured to control a speed of the engine based at least in part on the pneumatic output, the first weld output, or the second weld output, or any combination thereof.

9. A system comprising:
an engine;
an air compression system coupled to the engine and configured to produce a first pneumatic output; and
a multi-operator welding system coupled to the engine and configurable in an independent mode and a combined mode, wherein the multi-operator welding system comprises:
a first terminal set configured to receive a first weld output from the multi-operator welding system in the independent mode, and to receive the first weld output and a second weld output from the multi-operator welding system in the combined mode;
a second terminal set configured to receive the second weld output from the multi-operator welding system in the independent mode; and
an operator interface having a first interface portion configured to receive a first set of inputs relating to operating parameters of the first weld output, a second interface portion configured to receive a second set of inputs relating to operating parameters of the second weld output, and a mode input configured to switch the multi-operator welding system between the independent mode and the combined mode;
wherein the independent mode of the multi-operator welding system is configured to provide the first weld output and the first pneumatic output to a first torch simultaneously with the second weld output to a second torch.

10. The system of claim 9, wherein the engine is configured to drive the air compression system via a belt.

11. The system of claim 9, wherein the first terminal set and the second terminal set are each configured in the independent mode to perform a stick welding process, a tungsten inert gas (TIG) welding process, a shielded metal arc welding (SMAW) process, a gas metal arc welding (GMAW) process, a plasma cutting process, a carbon arc gouging process, or any combination thereof.

12. The system of claim 9, comprising an enclosure configured to at least partially surround the engine, the air compression system, and the multi-operator welding system.

13. A system comprising:
an engine;
a generator coupled to the engine, wherein the generator is configured to supply electrical power to a first welding system and to a second welding system, wherein a first weld output of the first welding system is combined with a second weld output of the second welding system in a combined mode;
an air compressor coupled to the engine, wherein the air compressor is configured to produce a pneumatic output;
a controller coupled to the engine, wherein the controller is configured to control a speed of the engine based at least in part on the pneumatic output, the first weld output, or the second weld output, or any combination thereof; and an enclosure configured to at least partially surround the engine, the generator, the first welding system, the second welding system, and the air compressor, wherein the enclosure comprises an operator interface having a first interface portion configured to receive a first set of inputs relating to operating parameters of the first weld output of the first welding system, a second interface portion configured to receive a second set of inputs relating to operating parameters of the second weld output of the second welding system, and a mode input configured to switch between the combined mode and an independent mode in which the first weld output of the first welding system is not combined with the second weld output of the second welding system.

14. The system of claim 13, wherein the first weld output and the second weld output comprise a constant current output, a constant voltage output, or any combination thereof.

15. The system of claim 13, comprising an auxiliary circuit coupled to the generator, wherein the auxiliary circuit is configured to provide an auxiliary output to an auxiliary output terminal.

16. The engine driven welder of claim 1, wherein the air compression system is configured to produce a second pneumatic output, and wherein the independent mode is configured to provide the first weld output and the pneumatic output to a first torch simultaneously with the second weld output and the second pneumatic output to a second torch.

17. The system of claim 9, wherein the air compression system is configured to produce a second pneumatic output, and wherein the independent mode of the multi-operator welding system is configured to provide the first weld output and the first pneumatic output to the first torch simultaneously with the second weld output and the second pneumatic output to the second torch.

18. The system of claim 13, wherein the air compressor is configured to produce a second pneumatic output, and wherein the independent mode is configured to provide the first weld output and the pneumatic output to a first torch simultaneously with the second weld output and the second pneumatic output to a second torch.

* * * * *